(12) United States Patent
Beattie (10) Patent No.: US 7,021,431 B2
(45) Date of Patent: Apr. 4, 2006

(54) DISK BRAKE CALIPER MOUNTING BRACKET

(76) Inventor: James C Beattie, 6747 Whitestone Rd., Baltimore, MD (US) 21207

( * ) Notice: Subject to any disclaimer, the term of this patent is extended or adjusted under 35 U.S.C. 154(b) by 15 days.

(21) Appl. No.: 10/615,385

(22) Filed: Jul. 9, 2003

(65) Prior Publication Data

US 2004/0074713 A1    Apr. 22, 2004

Related U.S. Application Data

(60) Provisional application No. 60/394,254, filed on Jul. 9, 2002.

(51) Int. Cl.
*F16D 65/00* (2006.01)

(52) U.S. Cl. .................. 188/73.1; 301/124.1; 301/131; 384/544; 384/589

(58) Field of Classification Search ............... 188/72.1, 188/18 A, 73.1; 301/105.1, 124.1, 126, 131; 384/499, 504, 505, 506, 543, 544, 589
See application file for complete search history.

(56) References Cited

U.S. PATENT DOCUMENTS

| | | | | |
|---|---|---|---|---|
| 4,274,513 A | * | 6/1981 | Kasselmann | 188/72.7 |
| 5,553,927 A | * | 9/1996 | Mastrangelo | 301/124.1 |
| 5,711,393 A | * | 1/1998 | Gage | 180/385 |
| 6,186,286 B1 | * | 2/2001 | Haussler et al. | 188/72.1 |
| 6,811,003 B1 | * | 11/2004 | Novak | 188/72.1 |

OTHER PUBLICATIONS

Port City Racing Online Catalogue Excerpts, 2000, pp. 1-4.

* cited by examiner

*Primary Examiner*—Melanie Torres
(74) *Attorney, Agent, or Firm*—Harbin King & Klima (57) ABSTRACT

A disk brake caliper mounting bracket is attachable to an axle tube to mount a brake caliper to the axle tube with a desired positioning and alignment. The bracket includes an axle tube mounting portion and a brake caliper mounting portion. The axle tube mounting portion includes a circular flange for mounting between the axle tube and a wheel mount to accurately position the bracket with respect to the axle tube. The brake caliper mounting portion is positioned at an angle to correspond with a camber of the wheel mount such that when the brake caliper is mounted to the brake caliper mounting portion, the brake caliper is accurately positioned and aligned with a disk brake rotor. The axle tube mounting portion and the brake caliper mounting portion can be integral with one another or separate components attached together.

45 Claims, 10 Drawing Sheets

DISK BRAKE CALIPER MOUNTING BRACKET

This application claims priority to U.S. patent Application No. 60/394,254, filed Jul. 9, 2002, which is incorporated by reference herein.

BACKGROUND OF THE INVENTION

The present invention relates to a disk brake caliper mounting bracket for mounting to a rear end of an automobile, and especially to an automobile adapted for stock car or circle track type racing.

Figure 1:
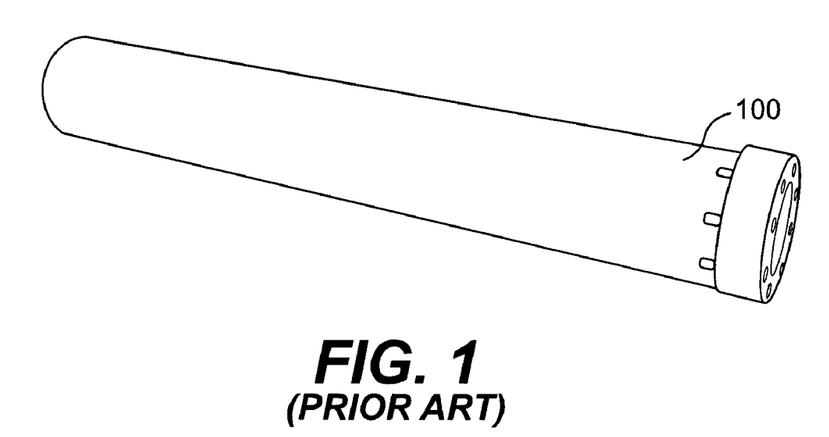
FIG. 1 (Prior Art) is a perspective view of an axle tube.
Figure 2:
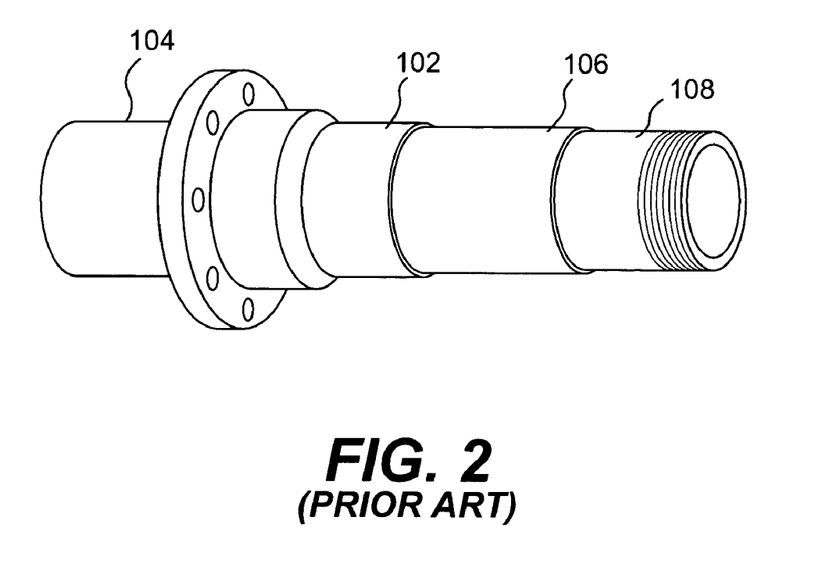
FIG. 2 (Prior Art) is a perspective view of a wheel mount.

These types of racing vehicles often use rear ends that are assembled from a number of separate components. For instance, FIG. 1 (Prior Art) shows an axle tube 100 adapted to mount on opposite sides to a center differential. As is known, these axle tubes provide a housing in which the respective axles rotate to transmit power from the differential to the driving wheels. The axle tubes 100 can be constructed of steel, aluminum, or other material. Wheel mounts 102, such as shown in FIG. 2 (Prior Art) mount to outboard ends of the axle tubes 100 with a plurality of bolts to rotationally support a wheel, as is known. See FIG. 3 (Prior Art). The wheel mount has an axle tube end 132 sized and adapted to engage an internal bore 134 of the axle tube 100. In one embodiment, the axle tube 100 has a thickened wall section 120 to accommodate a plurality of axially oriented threaded bores 122 circumferentially spaced around the axle tube 100. In a common known configuration, there are eight threaded bores 122 equally spaced around the thickened wall section 120. Eight alien head bolts are positioned through eight correspondingly positioned through-bores 136 on a circular flange portion 138 of the wheel mount 102 to engage the respective threaded bores 122 and attach the wheel mount 102 to the axle tube 100. The number of bores and bolts used to attach the wheel mount 102 to the axle tube 100 can be altered as desired.

Figure 3:
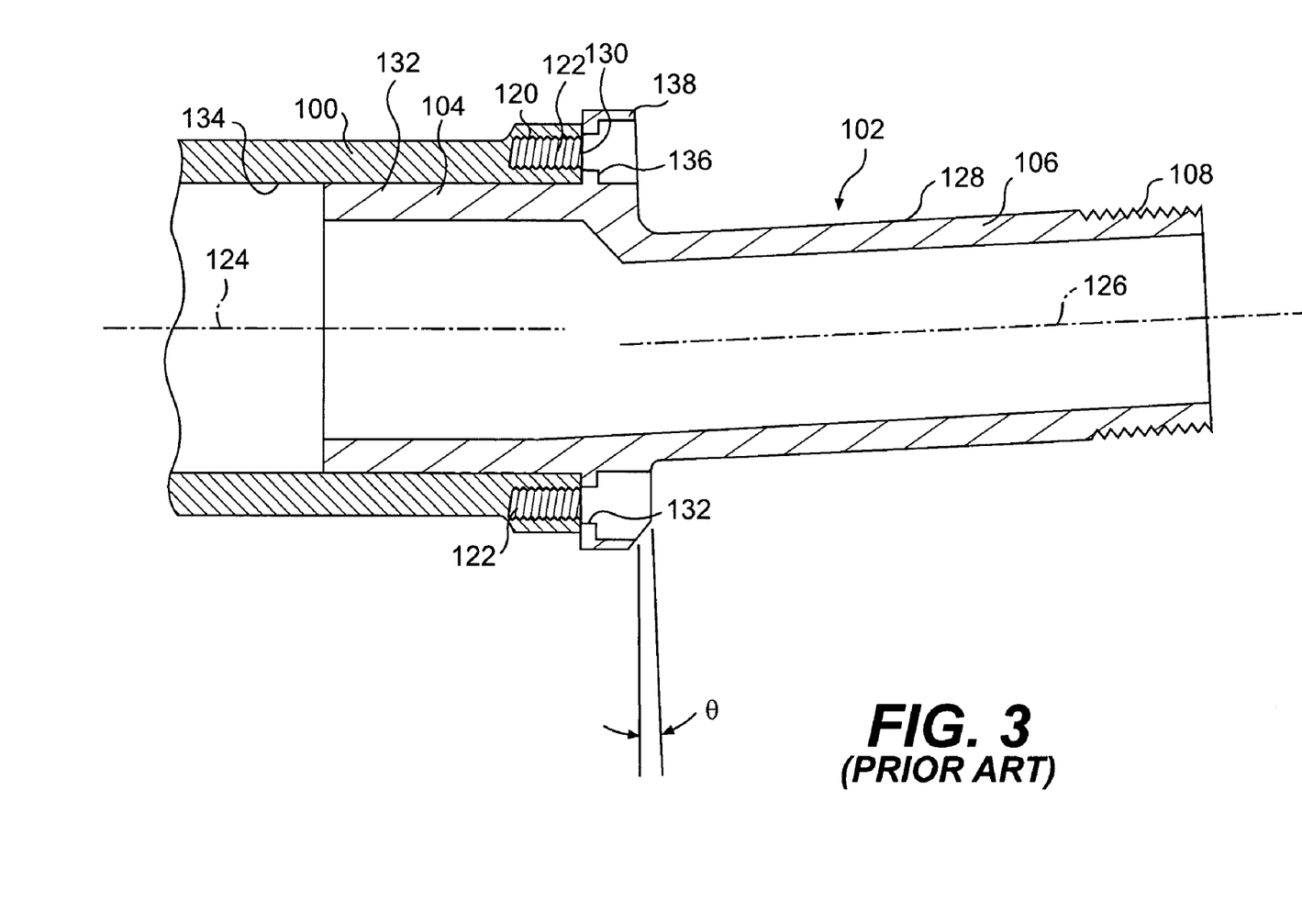
FIG. 3 (Prior Art) is a partial sectional view of a wheel mount mounted on an axle tube.

Each wheel mount 102 is typically machined (from steel) so that once mounted to the respective axle tube 100, the wheel mount 102 will provide a camber to the wheel once the wheel is mounted on the wheel mount 102. In other words, a first portion 104 of the wheel mount 102 will be aligned with an axis of the axle tube 100 while a second portion 106 of the wheel mount which supports the wheel will be machined to be at an angle to the axle tube 100. This angle, the camber, is typically selected to be between 0 and 2.5°, often in discrete 0.5° steps, but can be lesser or greater. The camber is shown as angle θ in FIG. 3 (Prior Art), with the left leg of the angle being perpendicular to an axis 124 of the axle tube 100 and the right leg of the angle being perpendicular to an axis 126 of a wheel mounting portion 128 of the wheel mount 102. In other words, the camber is the acute angle formed between the intersection of the axis 124 and the axis 126. If it is desired to alter the camber for a desired chassis set-up, the wheel mount 102 is removed from the end of the axle tube 100 and a different wheel mount 102 having the desired camber is reinstalled in the axle tube 100. Known wheel mounts 102 are generally offered in 0.5° increments from 0 to 2.5° camber. As best seen in FIGS. 2 and 3, an outboard end 108 of the wheel mount 102 is threaded to accept a single retaining nut.

Other structure can be attached to the exterior of the axle tubes 100 for mounting other components to the rear end, such as for instance, shock absorbers, tracking bars and brake mounting brackets. Various configurations of disk brake caliper mounting brackets 110 are known that clamp to an exterior circumference of the axles tubes 100 for mounting disk brake calipers to the rear end. These disk brake calipers work in a known manner with disk brake rotors mounted to the wheels to brake the vehicle. In known alternative embodiments, the caliper mounting brackets 112 are welded on the exterior of the axle tubes 100. In either of these embodiments, it is extremely important to accurately align the caliper mounting brackets with respect to the axle tubes 100 before fixedly attaching the brackets to the axle tubes. The caliper mounting brackets must be both positioned at a correct axial distance from the wheel mount to properly center the mounted brake caliper over the brake rotor, and be aligned at the proper angle such that the brake caliper is mounted parallel with the brake rotor. The caliper mounting bracket must also mount the brake caliper at a proper radial distance from the axle tube so that the brake caliper is mounted at a desired radial position with respect to the brake rotor. Otherwise, the calipers, once mounted to the mounting brackets, will not be in proper position and alignment with respect to the brake rotors and braking performance will suffer.

It has been found that with the conventional caliper mounting brackets, correctly positioning and aligning the caliper mounting brackets on the axle tubes is a difficult and time-consuming process. Even when the process is performed carefully, it is still extremely difficult to get an exact positioning and alignment of the caliper mounting brackets. This can result in having to shim the brake calipers on the caliper mounting brackets to get the desired positioning and alignment of the brake calipers. This shimming process is also time-consuming and is not preferred. Furthermore, if it is desired to change the camber of the axle stubs for a different chassis set-up, it will be necessary to reposition and/or realign the caliper mounting brackets to maintain the desired positioning and alignment of the brake calipers with respect to the brake rotors. This process is complicated by the fact that the known caliper mounting brackets tend to come in only a single version with a fixed alignment angle to accommodate for the camber of the axle stub. This fixed alignment angle is thus, by definition, not parallel with the brake rotor if the camber of the axle stub is then changed. At the very least, changing the camber of the axle stubs can entail repositioning and realigning the clamp-on style caliper mounting brackets. The weld-on style caliper mounting brackets, being welded to the axle tubes, cannot be repositioned easily. In either case, shimming is still likely to be required between the caliper mounting brackets and the brake calipers to get a desired positioning and alignment of the brake calipers with respect to the brake rotors, especially if the camber of the axle stub is not the same as the fixed alignment angle of the caliper mounting bracket.

It is desired to provide a caliper mounting bracket that overcomes the above deficiencies of the known caliper mounting brackets and which is simple and quick to install while achieving a desired positioning and alignment of the brake caliper.

SUMMARY OF THE INVENTION

The present invention is a disk brake caliper mounting bracket for attaching to an axle tube to mount a brake caliper to the axle tube with a desired positioning and alignment. In a first embodiment, the bracket includes an axle tube mounting portion and a brake caliper mounting portion. The axle tube mounting portion includes a circular flange for mounting between the axle tube and a wheel mount to accurately position the bracket with respect to the axle tube. The brake caliper mounting portion is positioned at an angle to correspond with a camber of the wheel mount such that when the brake caliper is mounted to the brake caliper mounting portion, the brake caliper is accurately positioned and aligned with a disk brake rotor.

In a second embodiment, the bracket includes a caliper portion and a cap portion and an axial through-bore therethrough so that the bracket can be clamped over an outer diameter of the axle tube. A positioning plate mounted between the axle tube and the wheel mount is attached to the bracket prior to tightly clamping the bracket on the axle tube to accurately position the bracket with respect to the axle tube. As with the first embodiment, the caliper portion to which the caliper mounts is positioned at an angle to correspond with a camber of the wheel mount such that when the brake caliper is mounted to the brake caliper mounting portion, the brake caliper is accurately positioned and aligned with the disk brake rotor.

It is an object of the present invention to provide a brake caliper mounting bracket that can be accurately mounted to an axle tube in a quick, simple and repeatable manner.

It is a further object of the present invention to provide a brake caliper mounting bracket that corresponds to a wheel mount camber to properly align a mounted brake caliper with respect to a disk brake rotor.

It is a further object of the present invention to provide a brake caliper mounting bracket that can be mounted to an axle tube to accurately position and align a brake caliper with respect to a disk brake rotor without the need for measuring or shimming of the brake caliper.

Other features and objects of the present invention will be apparent from the following detailed description taken in conjunction with the attached drawings, wherein like reference numerals are used for like components.

DETAILED DESCRIPTION OF THE INVENTION

FIGS. 4–7 show a first embodiment of a disk brake caliper bracket 10 according to the present invention. The bracket 10 includes an axle tube mounting portion 12 and a brake caliper mounting portion 14 connected together. An inboard side 11 of the bracket 10 faces toward the center differential when the bracket is mounted to the axle tube 100 and an outboard side 13 faces outwardly, away from the center differential. The axle tube mounting portion 12 includes a bore 16 configured and sized to closely fit over an exterior surface of the thickened wall section 120 of the axle tube 100 to provide radial alignment of the bracket 10 with respect to the axle tube 100 and to provide increased strength to the connection between the bracket 10 and the axle tube 100. A circular flange 18 partially closes bore 16 and provides a flat engagement surface 20 for engaging an outboard end surface 130 of the axle tube 100. Circular flange 18 includes a plurality of through-bores 22 circumferentially spaced around the flange. The number, positioning and size of the through-bores 22 is set to correspond to the bores 122 so that bolts can pass through the through-bores 22 to engage the threaded bores 122 and clamp the wheel mount 102, bracket 10 and axle tube 100 together. The flange 18 is relatively thin so as not to significantly alter the suspension geometry when the bracket 10 is disposed between the axle tube 100 and the wheel mount 102. Of course, a minimum flange thickness is determined that provides the desired strength to the bracket 10. In the preferred embodiment, the flange 18 is approximately 0.100 inch thick. The flange 18 includes a central through bore 24 through which the axle tube end 132 of the wheel mount 102 can pass to engage the internal bore 134 of the axle tube 100. The through bore 24 can be sized as desired to provide a loose clearance with respect to the external surface of axle tube end 132 or can be sized to provide a snugger fit for increased accuracy in radially positioning the bracket 10 with respect to the axle tube 100 and wheel mount 102.

Figure 4:
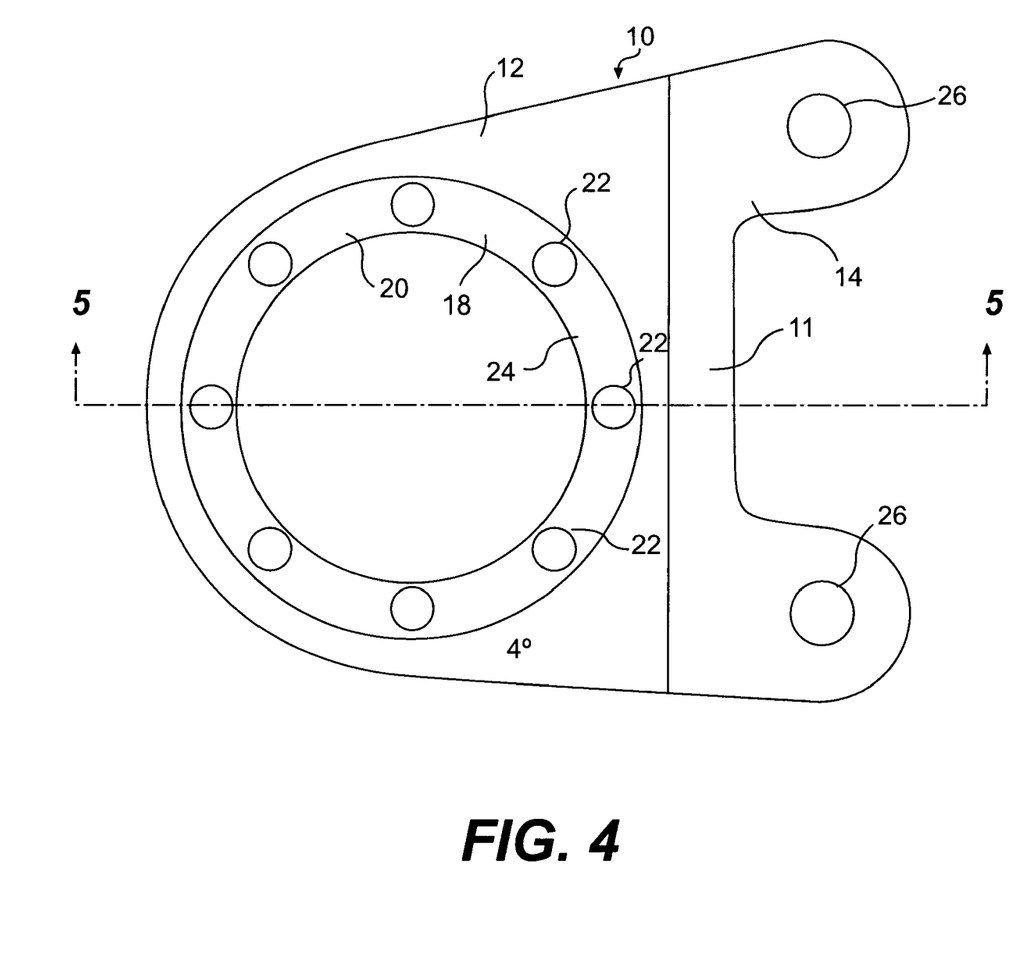
FIG. 4 is an elevational view of an inboard side of a first embodiment of a disk brake caliper bracket according to the present invention.
Figure 5:
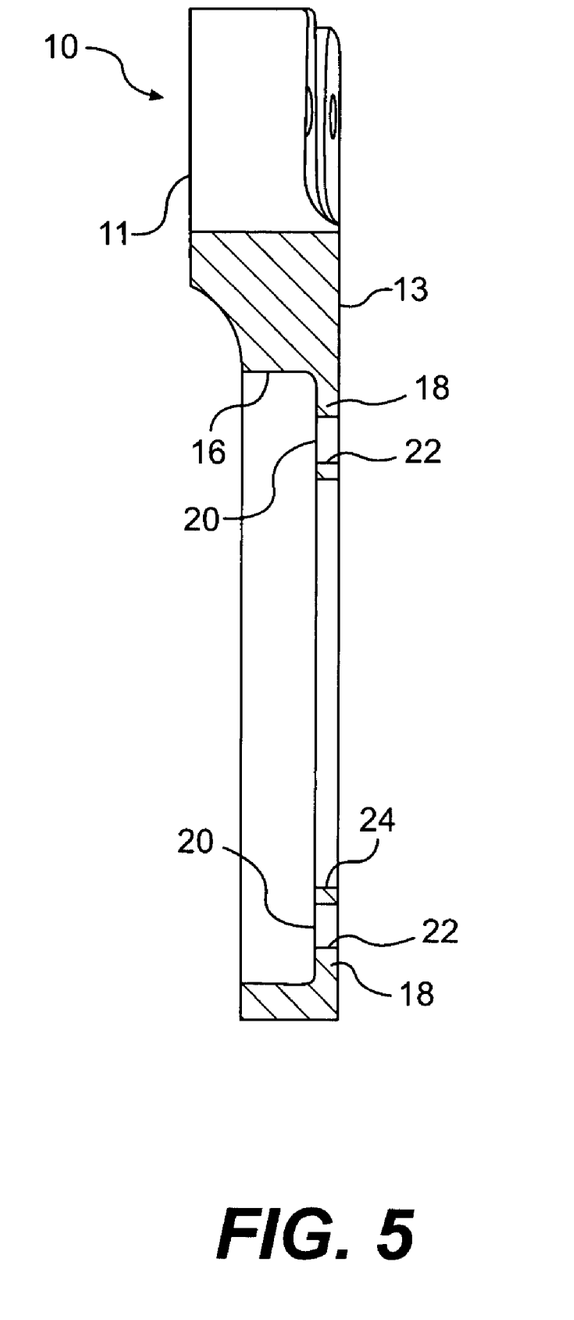
FIG. 5 is a sectional view of the disk brake caliper mounting bracket of FIG. 4 taken along section line 5—5 of FIG. 4.
Figure 6:
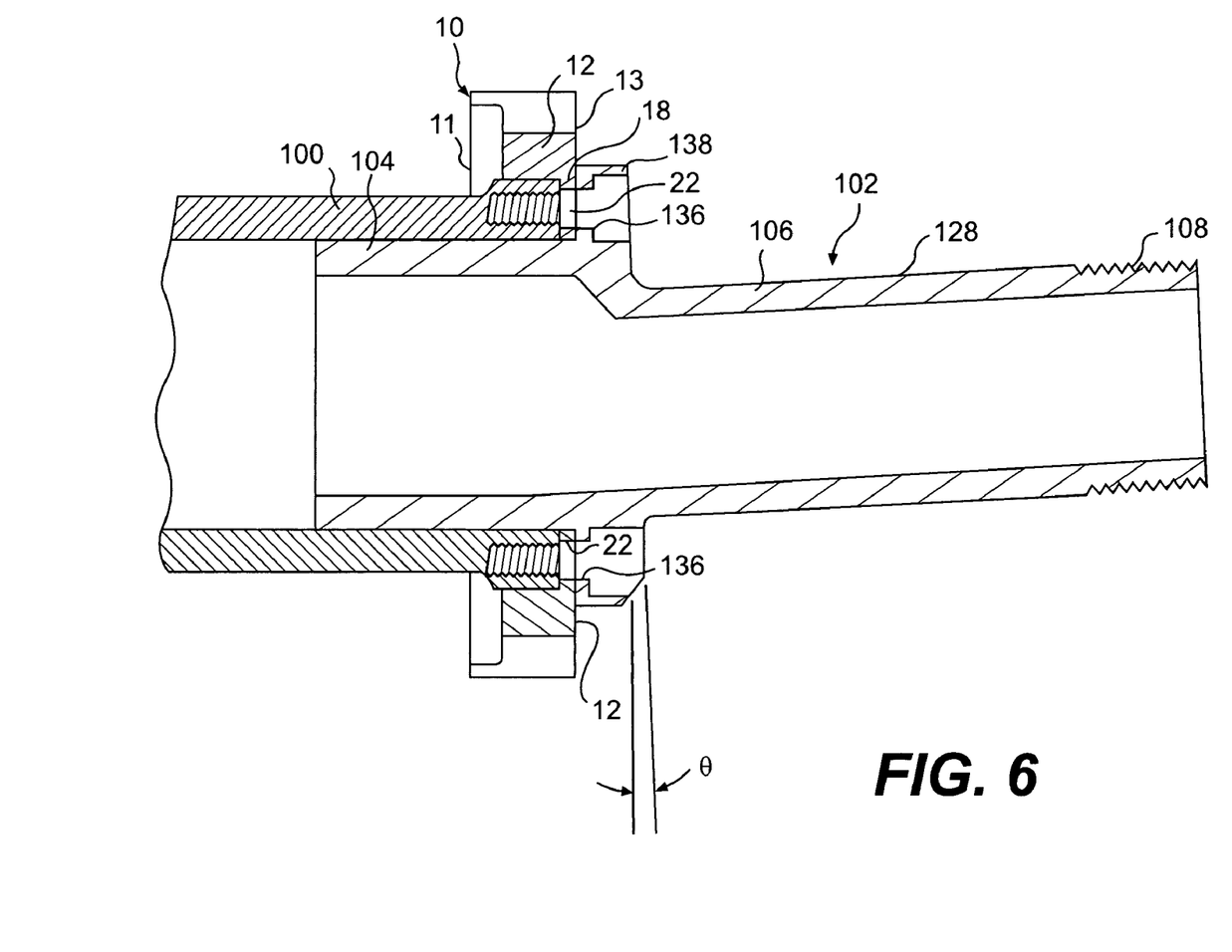
FIG. 6 is a partial sectional view of the disk brake caliper mounting bracket of FIG. 4 mounted between an axle tube and a wheel mount.
Figure 7:
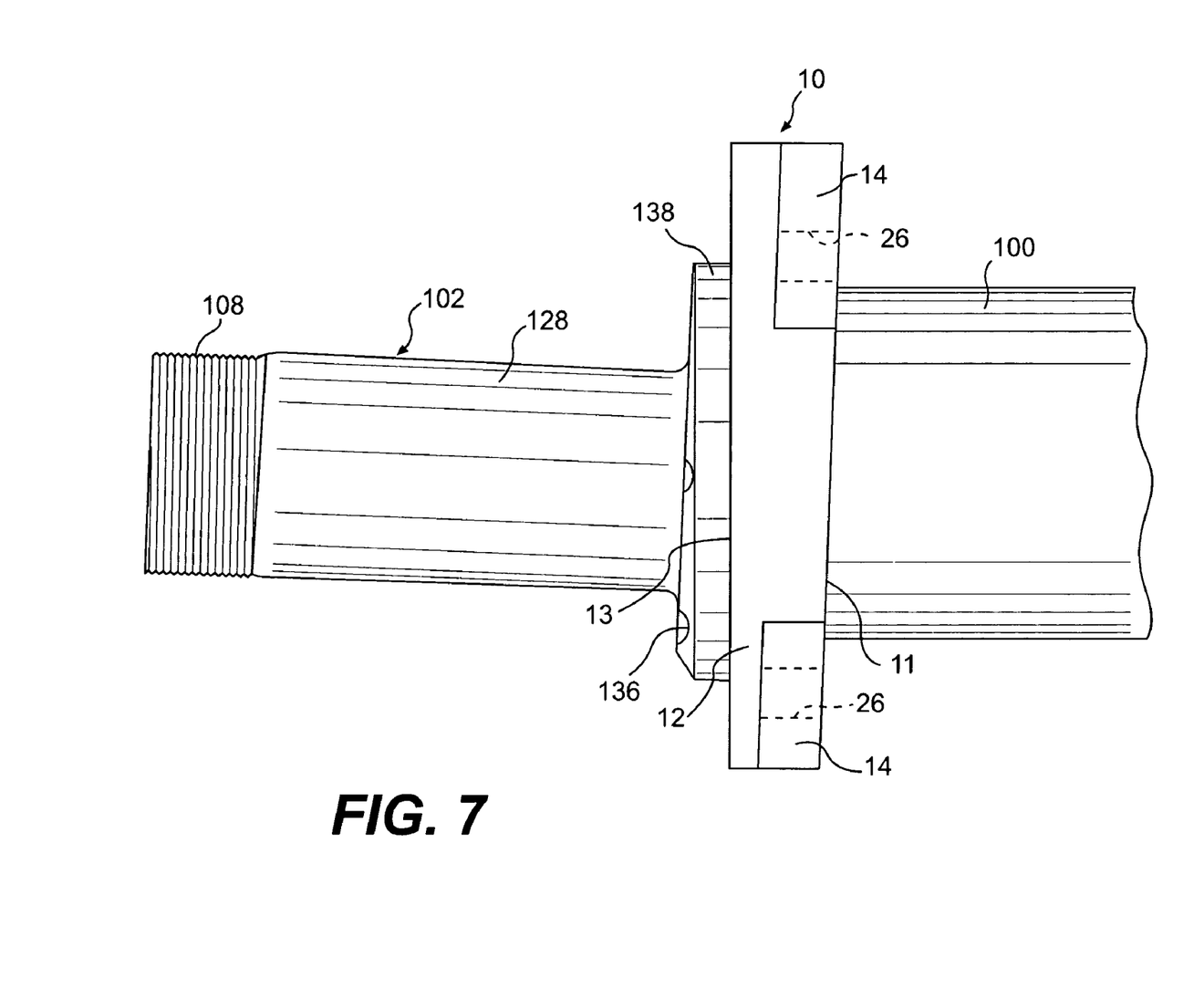
FIG. 7 is an elevational view of the disk brake caliper mounting bracket of FIG. 4 mounted between the axle tube and the wheel mount.
Figure 8:
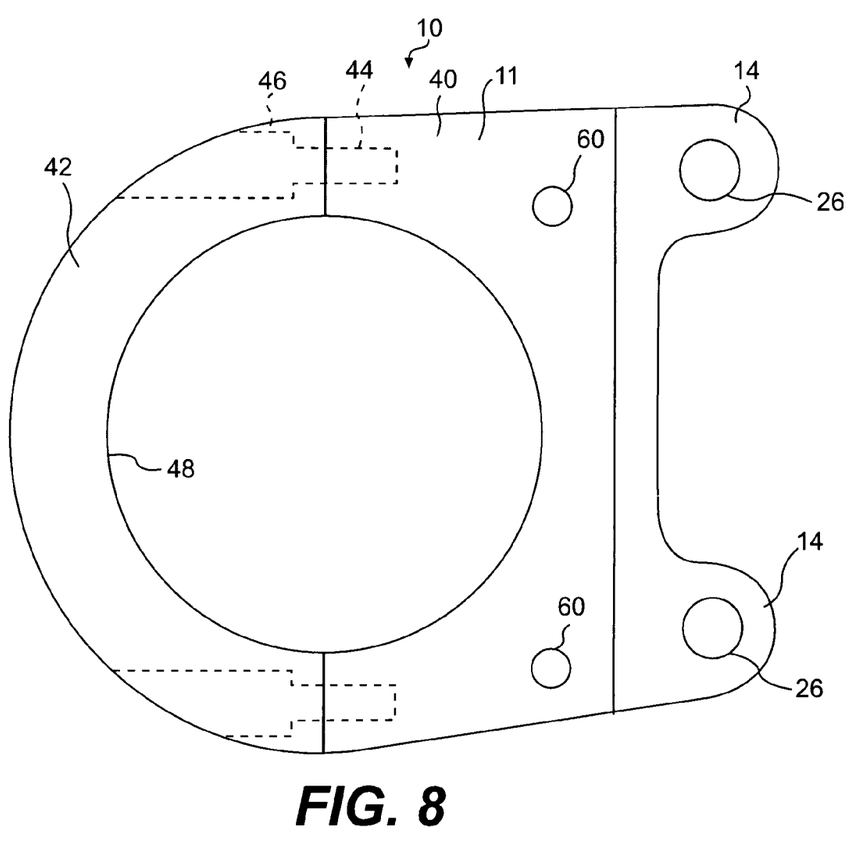
FIG. 8 is an elevational view of an inboard side of a second embodiment of a disk brake caliper bracket according to the present invention.
Figure 9:
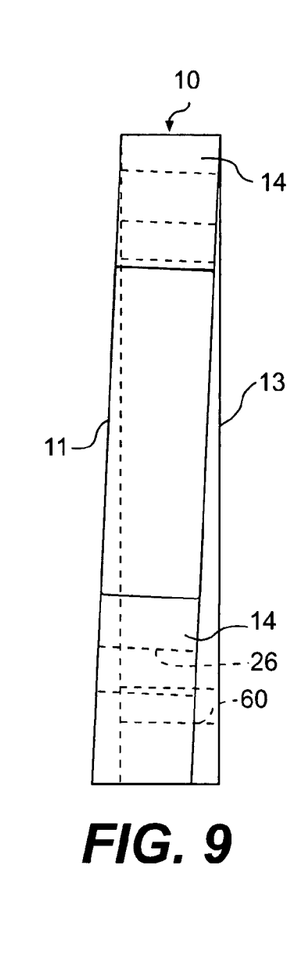
FIG. 9 is a side elevational view of the disk brake caliper mounting bracket of FIG. 8.
Figure 10:
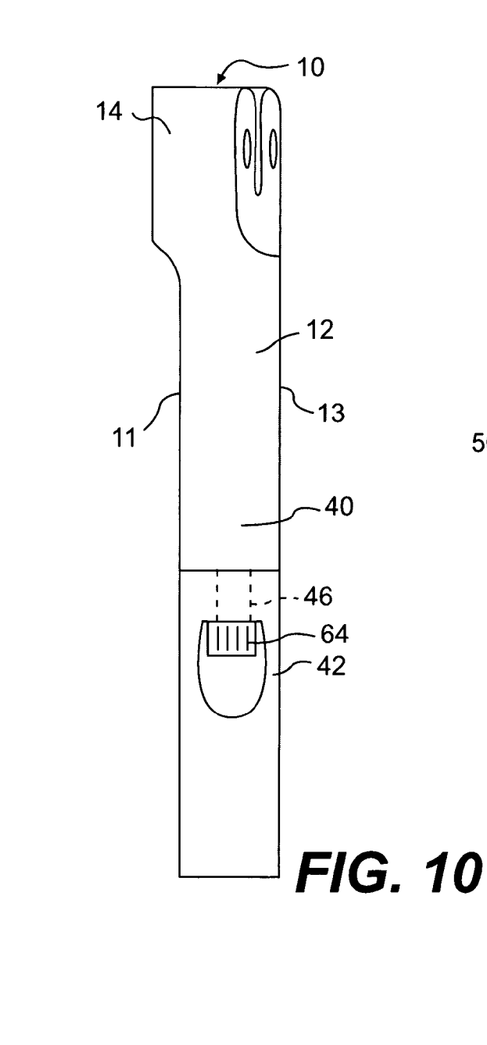
FIG. 10 is an elevational view of the disk brake caliper mounting bracket of FIG. 8.
Figure 11:
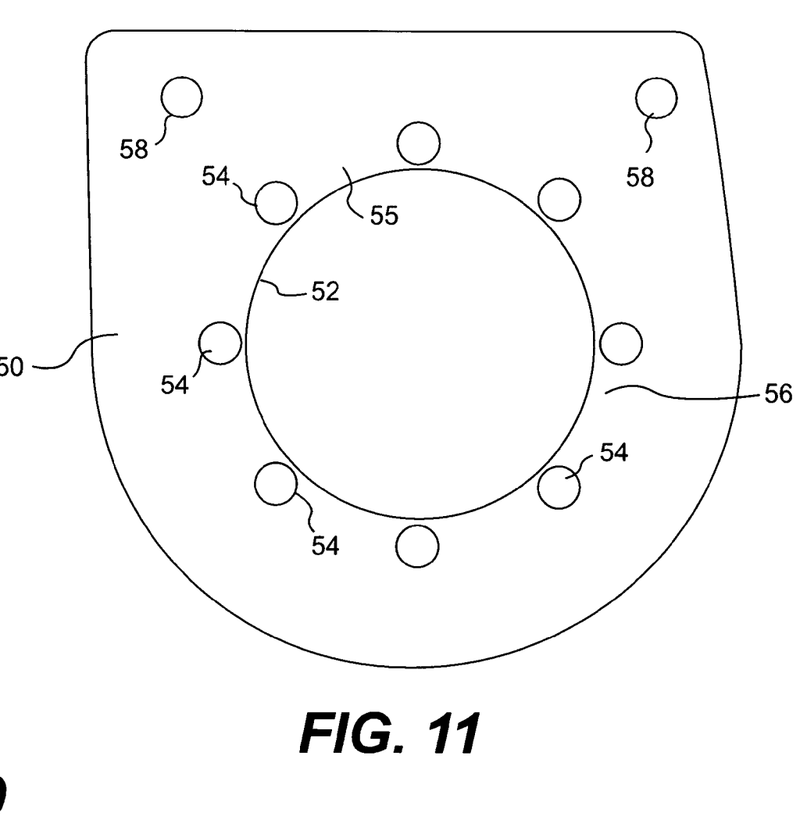
FIG. 11 is an elevational view of an inboard side of a mounting plate for positioning the disk brake caliper bracket of FIG. 8 on the axle tube.
Figure 12:
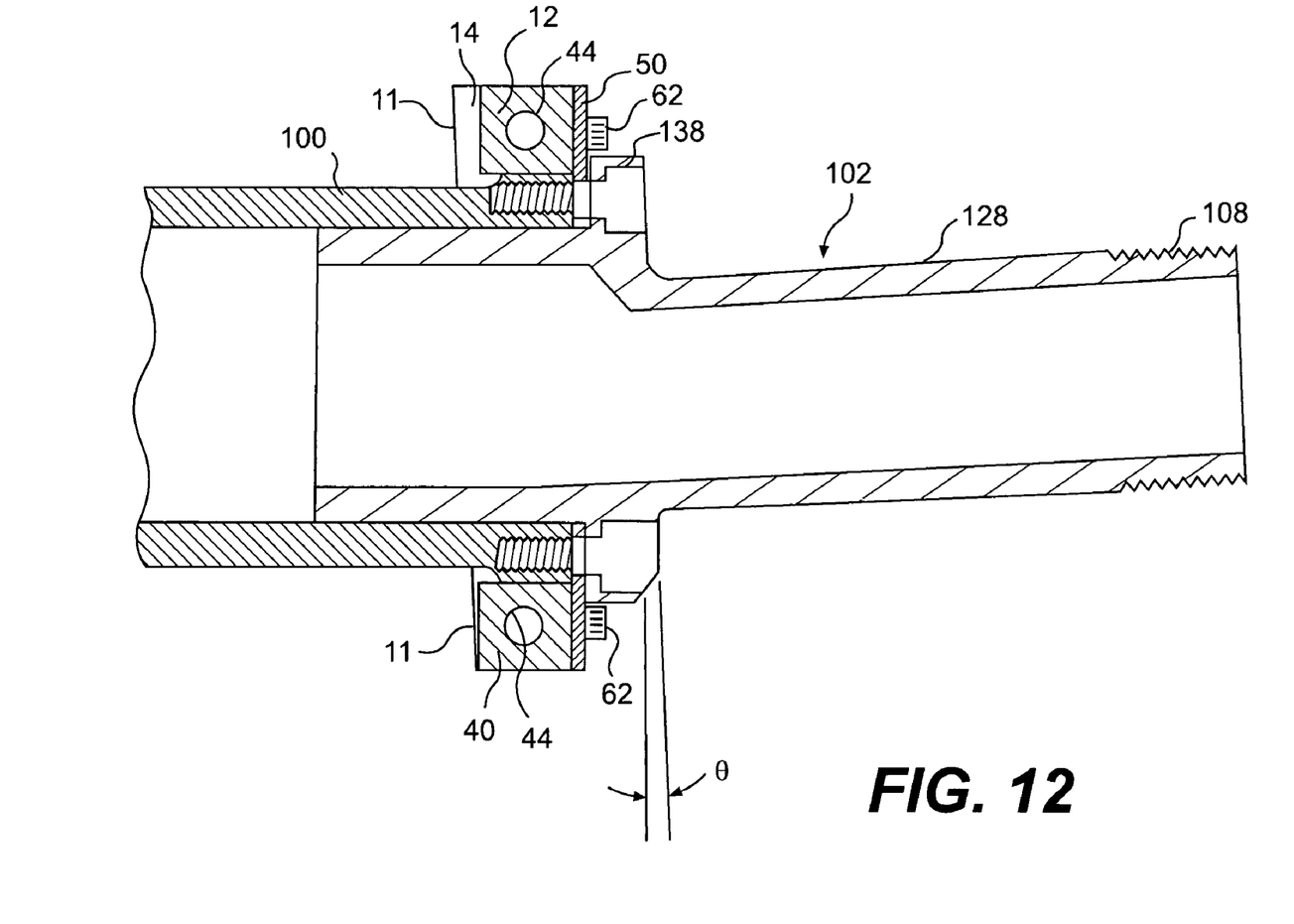
FIG. 12 is a partial sectional view of the disk brake caliper mounting bracket of FIG. 8 mounted between the axle tube and the wheel mount.

The brake caliper mounting portion 14 of the bracket 10 includes two threaded bores 26 positioned to align with two through-bores in a brake caliper so that the brake caliper can be mounted to the bracket 10 with a pair of bolts that engage the threaded bores 26. The threaded bores 26 are positioned to exactly radially position the caliper with respect to the brake rotor. An area 28 of the caliper mounting portion 14 is cut out between the two threaded bores to remove material from the bracket 10 and thereby reduce the weight of the bracket 10 and/or provide clearance for the brake caliper. Alternatively, this area can remain solid.

Figure 13:
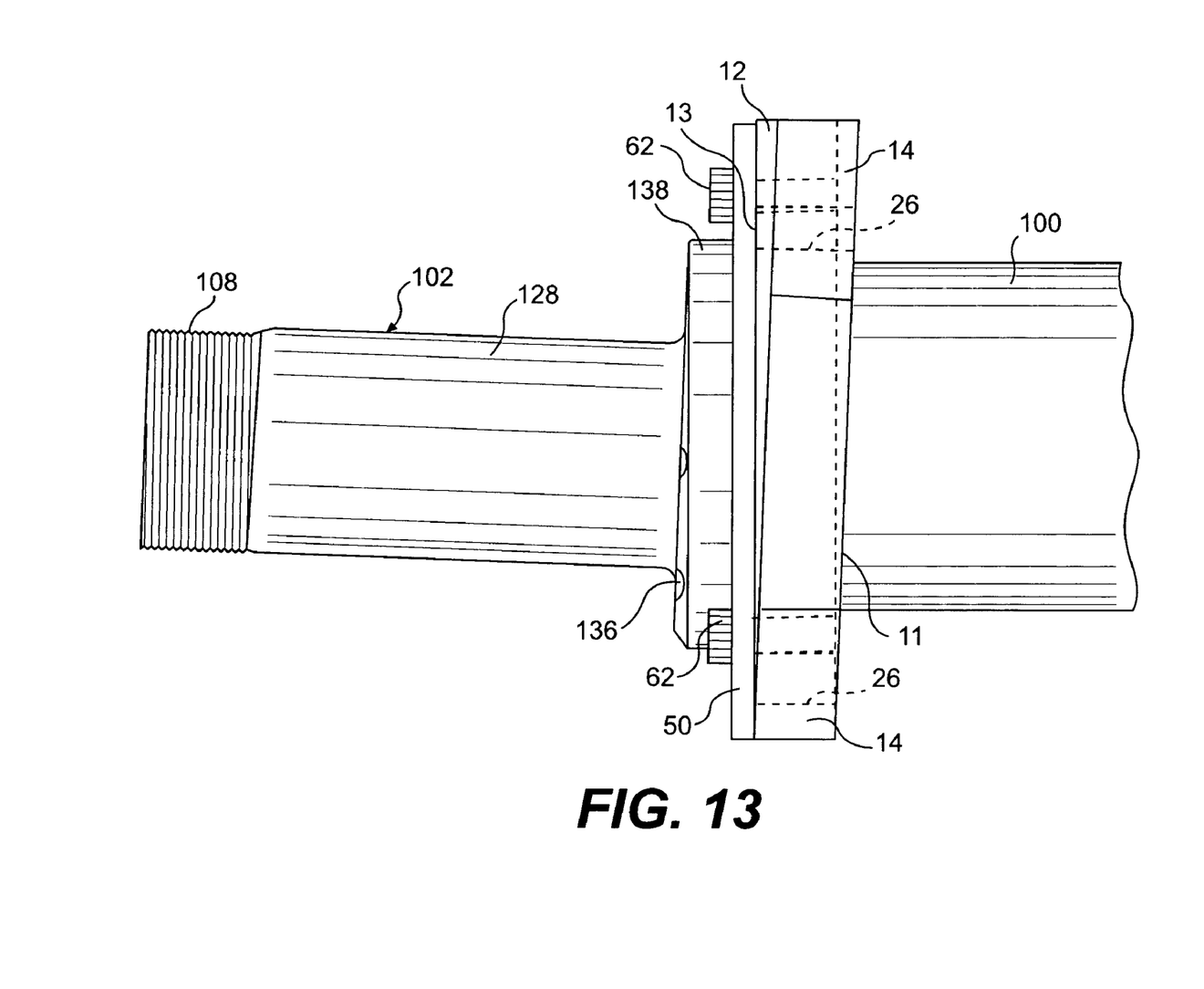
FIG. 13 is an elevational view of the disk brake caliper mounting bracket of FIG. 8 mounted between the axle tube and the wheel mount.

In the conventional arrangement, the brake caliper is generally mounted either directly in front of, or directly behind, the wheel mount 102, or, in other words, at 3:00 or 9:00 on a clock face. In such an arrangement, the caliper mounting portion 14 of the bracket is aligned at an angle with respect to the axle tube mounting portion 12, and this angle will be the same as the camber so that the brake caliper will properly align with the brake rotor. See FIGS. 7 and 13, where the angle of the caliper mounting portion 14 of the bracket 10 is exactly aligned with the camber of the wheel mount 102. Of course, if it is desired to mount the bracket 10 with a different orientation to reposition the caliper to a different position on the clock face, the alignment of the caliper mounting portion 14 of the bracket 10 with respect to the axle tube mounting portion 12 will be adjusted as required.

The bracket 10 thus provides an easy, effective manner in which to properly position and align the brake caliper with respect to the brake rotor. The correct axial positioning of the bracket 10, and thus, the brake caliper is guaranteed by the engagement of surface 20 of the bracket with the surface 130 of the axle tube. The correct radial positioning of the bracket is guaranteed by the fixed positioning of the bores 26 with respect to bore 16 and through-bores 22 of the bracket 10. Once the bracket 10 is clamped between the axle tube 100 and the wheel mount 102, the axial positioning and radial positioning of the caliper is fixed at the desired position. The alignment of the caliper with respect to the brake rotor is guaranteed by the machined alignment between the caliper mounting portion 14 and the axle tube mounting portion 12 of the bracket 10. No adjusting or shimming is required to get a quick, easy, repeatable and perfect bolt-on positioning and alignment of the brake caliper with respect to the brake rotor.

If it is desired to change the wheel camber, the wheel mount 102 will be exchanged with a wheel mount having the alternative desired camber. At the same time, since the wheel mount 102 has been removed from the axle tube 100, the bracket 10 can be easily exchanged for an alternative bracket 10 having an alignment between its caliper mounting portion 14 and its axle tube mounting portion 12 that corresponds to the camber of the new wheel mount 102. Thus, the bracket 10 will be provided in a plurality of versions having different alignments between the caliper mounting portion 14 and the axle tube mounting portion 12 that correspond to the number of alternative camber wheel mounts that are expected to be used. The bracket 10 will also be provided in left and right versions of the desired number of alignments to correspondingly position the brake calipers on the left and right sides of the vehicle. For instance, it is expected that the bracket 10 will be provided in 0.5, 1.0, 1.5, 2.0 and 2.5° camber versions with left and right models available for each camber version. The number and alignment of the bracket version can be altered as desired, including, providing brackets adapted to accommodate for caster of the wheel mount. The bracket 10 can be manufactured from aluminum, magnesium, steel or other materials. The bracket can be anodized, plated or coated and can be treated in other manners to provide desired characteristics.

In a second embodiment of the bracket 10 shown in FIGS. 8–13, the bracket 10 includes a separate component (plate 50) that provides the counterparts to bore 16, flange 18 and through-bores 22. Rather, the brake caliper mounting portion 14 includes a caliper portion 40 and a cap portion 42. The caliper portion 40 includes two threaded bores 44 and the cap portion 42 includes two through-bores 46 positioned and aligned with respect to the threaded bores 44 such that the cap portion 42 can be bolted to the caliper portion 40 with a pair of bolts passing through-bores 46 and engaging threaded bores 44. The bracket 10 includes an axial through bore 48 sized to clamp over the thickened wall section 120 of the axle tube 100 when the cap portion 42 is bolted firmly to the caliper portion 40.

The second embodiment includes a flat positioning plate 50. See FIGS. 11–13. The positioning plate 50 includes a central through-bore 52 through which the axle tube end 132 of the wheel mount 102 can pass to engage the internal bore 134 of the axle tube 100. A plurality of through-bores 54 are circumferentially spaced around the through-bore 52 on a flange portion 55. The number, positioning and size of the through-bores 54 is set to correspond to the bores 122 so that bolts can pass through the through-bores 54 to engage the threaded bores 122 and clamp the wheel mount 102, positioning plate 50 and axle tube 100 together. The positioning plate 50 includes a flat engagement surface 56 for engaging an outboard end surface 130 of the axle tube 100. As is seen, the through-bore 52, through-bores 54 and surface 56 correspond to the through-bore 24, through bores 22 and surface 20, respectively of the bracket 10 of the first embodiment, and function accordingly. Thus, the plate 50 corresponds generally to the axle tube mounting portion 12 of the first embodiment. As with the flange 18, the positioning plate 50, or at least flange portion 55, is relatively thin so as not to significantly alter the suspension geometry when the positioning plate 50 is disposed between the axle tube 100 and the wheel mount 102. Of course, a minimum plate thickness is determined that provides the desired strength to the plate 50. In the preferred embodiment, the positioning plate 50 is approximately 0.100 inch thick.

The positioning plate 50 includes two through-bores 58 and the caliper portion 40 includes two threaded bores 60 positioned to align with the through-bores 58. In this manner, the positioning plate 50 can be attached to the bracket 10 in a fixed alignment with a pair of bolts 62 (see FIGS. 12–13) that pass through the through-bores 58 and engage the threaded bores 60.

In this embodiment, the positioning plate 50 is positioned between the wheel mount 102 and the axle tube in a desired orientation and the wheel mount 102 is bolted to the axle tube 100 to firmly clamp the positioning plate 50 between the wheel mount 102 and the axle tube 100. The caliper portion 40 of the bracket 10 is then placed over the axle tube 100 so that the portion of the through-bore 48 in the caliper portion 40 engages the exterior of the thickened wall section 120 of the axle tube 100. The caliper portion is then rotated around the axle tube 100 until the though-bores 58 align with the threaded bores 60 and the bolts 62 are then passed though the through-bores 58 to engage the threaded bores 60 and finger-tightened. The cap portion 42 is then placed into position over the thickened wall section 120 of the axle tube 100 and bolted to the caliper portion 40 with bolts 64 engaging threaded bores 44. The cap portion 42 is then firmly clamped to the caliper portion 40 over the thickened wall section 120 of the axle tube 100 and then the bolts 62 are finally tightened to the desired torque. The brake caliper can then be bolted to the bracket 10 and is guaranteed to be in the desired position and alignment with respect to the brake rotor.

To install a new bracket 10 of this second embodiment to accommodate a new wheel mount camber, only the caliper portion 40 and cap portion 24, or even just the caliper portion 40 if the cap portion 42 and the caliper portion 42 do not come in a matched set, need be exchanged. The positioning plate 50 does not change and is the same for all camber versions (but is provided in left and right versions). As with the bracket 10 of the first embodiment, the bracket 10 of the second embodiment (i.e., the caliper portion 40, and if a matched set, the cap portion 42 too) would be provided in 0.5, 1.0, 1.5, 2.0 and 2.5° camber versions with left and right models available for each camber version. As with the first embodiment, no adjusting or shimming is required to get a quick, easy, repeatable and perfect bolt-on positioning and alignment of the brake caliper with respect to the brake rotor with the bracket 10 of the second embodiment.

It is also intended that the plate 50 can include a thickened portion with a bore 16, similarly to the first embodiment above, configured and sized to closely fit over the exterior surface of the thickened wall section 120 of the axle tube 100 so that the tube cap portion 42 and caliper portion 40 can be omitted.

Provision can be made for attaching the respective bracket 10 to the respective wheel mount 102 in the desired orientation so that the two components can be handled, and stored, as a single unit, reducing the time required for aligning the two components together and reducing the chance of pairing a bracket 10 and a wheel mount 102 that have different camber alignments and which could be time-consuming to correct, especially under the hectic pace of race preparation. For instance, bracket 10 can be attached to the flange 138 of wheel mount 102 with one or more screws. Further, the bracket 10 can be adapted for mounting only to the wheel mount 102, such as to the flange 138 of the wheel mount 102, with or without contacting the axle tube directly.

Gaskets, or other components, can be used between the various components, as desired, without affecting the alignment of the bracket 10 provided by engagement of the bracket 10 with the axle tube 100 or wheel mount 102. The engagement can be direct (without interpositioned components) or indirect (with interpositioned components, such as gaskets). Other types of fasteners, including other types of threaded fasteners, can be used to attach the various components together.

Different aspects of the different embodiments can be combined in different manners to create new embodiments.

What is claimed is:

1. A disk brake caliper mounting bracket, comprising:
an axle tube mounting portion; and
a brake caliper mounting portion;
wherein, the axle tube mounting portion is constructed and arranged to engage a portion of a wheel mount, the wheel mount being attachable to an axle tube, to place the brake caliper mounting portion in alignment with a wheel mounting portion of the wheel mount, wherein the axle tube mounting portion and the brake caliper mounting portion are aligned at an angle to one another which is equal to an angle between axes of the axle tube and the wheel mounting portion of the wheel mount, the angle being greater than 0°.

2. A disk brake caliper mounting bracket as in claim 1, wherein the axle tube mounting portion includes a flange portion for engaging the wheel mount.

3. A disk brake caliper mounting bracket as in claim 2, wherein the flange portion includes a plurality of through bores arranged in a circle around the flange to align with a plurality of threaded bores in the axle tube and accommodate threaded fasteners engaged with the threaded bores in the axle tube.

4. A disk brake caliper mounting bracket as in claim 3, wherein the flange portion includes a central through bore through which a portion of the wheel mount can be positioned when the wheel mount is mounted to the axle tube.

5. A disk brake caliper mounting bracket as in claim 4, wherein the axle tube mounting portion includes a bore configured and sized to snugly fit over an exterior surface of the axle tube.

6. A disk brake caliper mounting bracket as in claim 4, wherein the axle tube mounting portion and the brake caliper mounting portion are separate portions of a single component.

7. A disk brake caliper mounting bracket as in claim 4, wherein the axle tube mounting portion and the brake caliper mounting portion are separate components, attachable to one another.

8. A disk brake caliper mounting bracket as in claim 7, and further comprising:
a caliper portion attached to the brake caliper mounting portion; and
a separate cap portion attachable to the caliper portion to clamp the bracket around an external surface of the axle tube.

9. A disk brake caliper mounting bracket as in claim 8, wherein at least one of the caliper portion and the cap portion is attached to the axle tube mounting portion with at least one threaded fastener.

10. A disk brake caliper mounting bracket as in claim 9, wherein the cap portion is attached to the caliper portion with at least two bolts engaging the two portions, the two bolts aligned generally in a plane normal to an axis of the axle tube when the bracket is mounted to the axle tube.

11. A disk brake caliper mounting bracket as in claim 1, wherein the axle tube mounting portion includes a bore configured and sized to snugly fit over an exterior surface of the axle tube.

12. A disk brake caliper mounting bracket as in claim 1, wherein the axle tube mounting portion and the brake caliper mounting portion are separate portions of a single component.

13. A disk brake caliper mourning bracket as in claim 1, wherein the axle tube mounting portion and the brake caliper mounting portion are separate components, attachable to one another.

14. A disk brake caliper mounting bracket as in claim 13, and further comprising:
a caliper portion attached to the brake caliper mounting portion; and
a separate cap portion attachable to the caliper portion to clamp the bracket around an external surface of the axle tube.

15. A disk brake caliper mounting bracket as in claim 14, wherein at least one of the caliper portion and the cap portion is attached to the axle tube mounting portion with at least one threaded fastener.

16. A disk brake caliper mounting bracket as in claim 15, wherein the cap portion is attached to the caliper portion with at least two bolts engaging the two portions, the two bolts aligned generally in a plane normal to an axis of the axle tube when the bracket is mounted to the axle tube.

17. A disk brake caliper mounting bracket as in claim 1, and further comprising the wheel mount.

18. A disk brake caliper mounting bracket as in claim 1, and further comprising the axle rube.

19. A disk brake caliper mounting bracket as in claim 1, wherein, there is direct engagement between the axle rube mounting portion and the wheel mount.

20. A disk brake caliper mounting bracket, comprising:
an axle tube mounting portion; and
a brake caliper mounting portion;
wherein, the axle tube mounting portion is constructed and arranged to engage an end surface of an axle tube to place the brake caliper mounting portion in alignment with a wheel mounting portion of a wheel mount attachable to the axle tube, wherein the axle tube mounting portion and the brake caliper mounting portion are aligned at an angle to one another which is equal to an angle between axes of the axle Lube and the wheel mounting portion of the wheel mount, the angle being greater than 0°.

21. A disk brake caliper mounting bracket as in claim 20, wherein the axle tube mounting portion includes a flange portion for engaging tile wheel mount.

22. A disk brake caliper mounting bracket as in claim 21, wherein the flange portion includes a plurality of through bores arranged in a circle around the flange to align with a plurality of threaded bores in the axle tube and accomodate threaded fasteners engaged with the threaded bores in the axle tube.

23. A disk brake caliper mounting bracket as in claim 22, wherein the flange portion includes a central through bore through which a portion of the wheel mount can be positioned when the wheel mount is mounted to the axle tube.

24. A disk brake caliper mounting bracket as in claim 23, wherein the axle tube mounting portion includes a bore configured and sized to snugly fit over an exterior surface of the axle tube.

25. A disk brake caliper mounting bracket as in claim 23, wherein the axle tube mounting portion and the brake caliper mounting portion are separate portions of a single component.

26. A disk braise caliper mounting bracket as in claim 23, wherein the axle tube mounting portion and the brake caliper mounting portion are separate components, attachable to one another.

27. A disk brake caliper mounting bracket as in claim 26, and further comprising:
    a caliper portion attached to the brake caliper mounting portion; and
    a separate cap portion attachable to the caliper portion to clamp the bracket around an external surface of the axle tube.

28. A disk brake caliper mounting bracket as in claim 27, wherein at least one of the caliper portion and the cap portion is attached to the axle tube mounting portion with at least one threaded fastener.

29. A disk brake caliper mounting bracket as in claim 28, wherein the cap portion is attached to the caliper portion with at least two bolts engaging the two portions, the two bolts aligned generally in a plane normal to an axis of the axle tube when the bracket is mounted to the axle tube.

30. A disk brake caliper mounting bracket as in claim 20, wherein the axle tube mounting portion includes a bore configured and sized to snugly fit over an exterior surface of the axle tube.

31. A disk brake caliper mounting bracket as in claim 20, wherein the axle tube mounting portion and the brake caliper mounting portion are separate portions of a single component.

32. A disk brake caliper mounting bracket as in claim 20, wherein the axle tube mounting portion and the brake caliper mounting portion are separate components, attachable to one another.

33. A disk brake caliper mounting bracket as in claim 32, and further comprising:
    a caliper portion attached to the brake caliper mounting pardon; and
    a separate cap portion attachable to the caliper portion to clamp the bracket around an external surface of the axle tube.

34. A disk brake caliper mounting bracket as in claim 33, wherein at least one of the caliper pardon and the cap portion is attached to the axle tube mounting portion with at least one threaded fastener.

35. A disk brake caliper mounting bracket as in claim 34, wherein the cap portion is attached to the caliper portion with at least two bolts engaging the two portions, the two bolts aligned generally in a plane normal to an axis of the axle tube when the bracket is mounted to the axle tube.

36. A disk brake caliper mounting bracket as in claim 20, and further comprising the wheel mount.

37. A disk brake caliper mounting bracket as in claim 20, and further comprising the axle tube.

38. A disk brake caliper mounting bracket as in claim 20, wherein, there is direct engagement between the axle cube mounting portion and the wheel mount.

39. A disk brake caliper mounting bracket as in claim 20, wherein a portion of the axle tube mounting portion is constructed and arranged to be clamped between the axle tube and the wheel mount.

40. A disk brake caliper mounting bracket as in claim 23, wherein a portion of the axle tube mounting portion is constructed and arranged to be clamped between the axle tube and the wheel mount.

41. A disk brake caliper mounting bracket as in claim 28, wherein a portion of the axle tube mounting portion is constructed and arranged to be clamped between the axle tube and the wheel mount.

42. A disk brake caliper mounting bracket, comprising:
    an axle tube mounting portion; and
    a brake caliper mounting portion, the axle tube mounting portion and the brake caliper mounting portion being aligned at an angle to one another;
    wherein, the axle tube mounting portion is constructed and arranged to be clamped between an end surface of an axle Lube and a wheel mount to place the brake caliper mounting portion in alignment with a wheel mounting portion of the wheel mount, wherein the axle tube mounting portion and the brake caliper mounting portion are aligned at an angle to one another which is equal to an angle between axes of the axle cube and the wheel mounting portion of the wheel mount, the angle being greater than 0°.

43. A method for accurately positioning a disk brake caliper with respect to a wheel mount, comprising:
    acquiring a reference surface on one of an axle tube and a wheel mount, the reference surface being perpendicular to a longitudinal axis of the axle tube when the wheel mount is attached to the axle tube;
    determining a desired alignment angle of the disk brake caliper with respect to the longitudinal axis of the axle tube;
    providing a disk brake caliper mounting bracket that includes an axle tube mounting portion for engaging the reference surface and a brake caliper mounting portion angled with respect to the axle tube mounting portion at the desired alignment angle, wherein the desired alignment angle is equal to an angle between axes of the axle tube and a wheel mounting portion of the wheel mount, the angle being greater than 0°;
    positioning the axle tube mounting portion against the reference surface;
    rotating the disk brake caliper mounting bracket with respect to one of the axle tube and the wheel mount to position the disk brake caliper mounting bracket at a desired circumferential position;
    locking the disk brake caliper mounting bracket in the desired position; and
    mounting the disk brake caliper to the brake caliper mounting portion.

44. A method as in claim 43, and further comprising:
    positioning the brake caliper mounting portion at a desired radial distance from the longitudinal axis of the axle tube.

45. A method as in claim 43, wherein locking the disk brake caliper mounting bracket in the desired position comprises clamping the disk brake caliper mounting bracket between the axle tube and the wheel mount.

* * * * *